United States Patent
Miller, III

(10) Patent No.: US 8,116,029 B2
(45) Date of Patent: Feb. 14, 2012

(54) CONTAMINANT-CONTROL MATERIAL FOR USE IN AN ELECTRONIC ENCLOSURE

(75) Inventor: Stanley B. Miller, III, Eden Prairie, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 12/268,058

(22) Filed: Nov. 10, 2008

(65) Prior Publication Data

US 2009/0124495 A1    May 14, 2009

Related U.S. Application Data

(60) Provisional application No. 60/986,875, filed on Nov. 9, 2007.

(51) Int. Cl.
G11B 33/14 (2006.01)
B01D 53/04 (2006.01)
(52) U.S. Cl. .................... 360/97.02; 95/117; 95/193
(58) Field of Classification Search .............. 502/5, 400, 502/416, 417; 95/117, 193; 360/97.02
See application file for complete search history.

(56) References Cited

U.S. PATENT DOCUMENTS

| | | | |
|---|---|---|---|
| 2,027,093 A * | 1/1936 | Downs | 95/91 |
| 5,876,487 A * | 3/1999 | Dahlgren et al. | 96/13 |
| 6,926,148 B2 | 8/2005 | McPhail | |
| 6,926,761 B2 | 8/2005 | Johnson et al. | |
| 6,936,093 B2 | 8/2005 | Isogawa et al. | |
| 7,095,584 B2 | 8/2006 | Logan | |
| 7,125,433 B2 | 10/2006 | Garikipati et al. | |
| 7,166,142 B2 | 1/2007 | Tuma et al. | |
| 7,367,997 B1 | 5/2008 | Isogawa | |
| 7,404,836 B2 | 7/2008 | Garikipati et al. | |
| 2003/0224932 A1* | 12/2003 | Saaski et al. | 502/416 |
| 2006/0097223 A1* | 5/2006 | Powers et al. | 252/194 |

* cited by examiner

*Primary Examiner* — Wayne Langel
*Assistant Examiner* — Syed Iqbal
(74) *Attorney, Agent, or Firm* — Pauly, Devries Smith & Deffner, L.L.C.

(57) ABSTRACT

A filter material for use in an electronic enclosure. The filter material includes a mixture of carbon and calcium chloride. In some embodiments, the filter material further includes a polyolefin binder, and optionally other ingredients. In one embodiment, the filter material includes 5 to 15 percent calcium chloride, and in another embodiment, the filter material includes 10 percent calcium chloride.

10 Claims, 2 Drawing Sheets

US 8,116,029 B2

CONTAMINANT-CONTROL MATERIAL FOR USE IN AN ELECTRONIC ENCLOSURE

PRIORITY

This application claims the benefit of U.S. Provisional Patent Application Ser. No. 60/986,875, entitled "CONTAMINANT-CONTROL MATERIAL FOR USE IN AN ELECTRONIC ENCLOSURE," filed Nov. 9, 2007, the contents of which is herein incorporated by reference in its entirety.

FIELD OF THE INVENTION

The present invention relates to electronic enclosures, and more particularly, to materials for gas conditioning and filtering inside of an electronic enclosure.

BACKGROUND

Electronic enclosures may be used to house a variety of sensitive electronic components. An example electronic enclosure is a hard disk drive for a computer. Sensitive electronic equipment may be damaged or have its operation affected by the presence of moisture or various chemical species, such as hydrocarbons. Furthermore, the presence of particles, even of microscopic dimensions, can cause degraded performance or even catastrophic failure of electronic components.

An electronic enclosure is often required to have a breather vent to allow gas pressures on the inside of the enclosure to equalize with the atmospheric pressure outside the electronic enclosure. This is particularly important because the temperature of the electronic enclosure changes during operation, such that increased pressure is developed inside the enclosure and must be vented in a controlled fashion. Likewise, as the electronic enclosure cools, atmospheric air must be drawn in to prevent the pressure inside the electronic enclosure from dropping too low. Contaminants such as moisture, particles, or gaseous chemicals may enter an electronic enclosure in this way.

Contaminants can also be generated inside of an electronic enclosure. For example, various materials used to construct an electronic enclosure and its contained components may "off gas" harmful chemical species. Moreover, particles may be generated by the operation of an electronic component. For example, a disk drive that spins rapidly may generate particles as various components wear or in the event of contact between a moving part and a non-moving part.

Filters are typically placed in electronic enclosures to condition the gas inside the enclosure and to remove contaminants. Such a filter is typically placed over a breather opening in the electronic enclosure to allow the filter to filter air entering the electronic enclosure. The filter is also typically capable of filtering gases within the electronic enclosure. For example, in a disk drive, a rotating disk tends to set up rotating gas flow within the electronic enclosure. The filter can be positioned to interface with this gas flow, such that contaminants can be removed from the gas stream. A filter in an electronic enclosure may be capable of removing water vapor from the gas. A filter may also be capable of removing undesirable gaseous species, such as hydrocarbons, and particles.

However, traditional filters known in the art may actually be prone to generation of particles in some situations, thus resulting in the type of contamination that the filter is supposed to prevent. A typical filter composition includes silica gel to provide for absorption of water vapor inside the electronic enclosure. However, this silica gel can under certain circumstances escape from the filter, such as if the bonds or seals that contain the silica gel degrade or fail. Traditionally the size of those silica gel particles has been so small that they have not posed a risk in most circumstances. However, the lower tolerances of modern drives has resulted in the applicants identifying that even quite small silica gel particles can become a significant problem in electronic enclosures.

Notably, it is often difficult to prevent contamination of the exterior surface of the filter with silica gel particles during the manufacture of the filter. Free silica gel particles within an electronic enclosure may have harmful effects on the operation of the electronic components within the enclosure. Silica gel particles are typically defined as hard particles, and as such, their presence can cause damage to electronic components. For example, if a hard silica particle enters the clearance between a rotating platen of a disk drive and the drive head, a drive crash may result. This can result in loss of data.

Improved filters for electronic enclosures are needed. In particular, a filter for an electronic enclosure that does not contain hard particles is desired.

SUMMARY OF THE INVENTION

A composition for use as a filter in an electronic enclosure is disclosed. The composition includes, in certain embodiments, carbon and calcium chloride.

In another aspect of the invention, a mixture for use as a filter material in an electronic enclosure is disclosed. The mixture includes carbon, a binder disposed within the carbon, and a salt disposed within the carbon and binder.

In another aspect of the invention, a mixture for use as a filter material in an electronic enclosure is disclosed. The mixture includes carbon, a binder disposed within the carbon, and calcium chloride disposed within the carbon and binder.

In yet another aspect of the invention, a mixture for use as a filter material in an electronic enclosure is disclosed. The mixture includes carbon, binder disposed within the carbon, and about 5% to 15% by mass of calcium chloride.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope of the present invention is defined by the appended claims and their legal equivalents.

BRIEF DESCRIPTION OF THE DRAWINGS

The invention may be more completely understood in connection with the following drawings, in which.

While the invention is susceptible to various modifications and alternative forms, specifics thereof have been shown by way of example and drawings, and will be described in detail. It should be understood, however, that the invention is not limited to the particular embodiments described. On the contrary, the intention is to cover modifications, equivalents, and alternatives falling within the spirit and scope of the invention.

DETAILED DESCRIPTION OF THE INVENTION

Figure 1A:
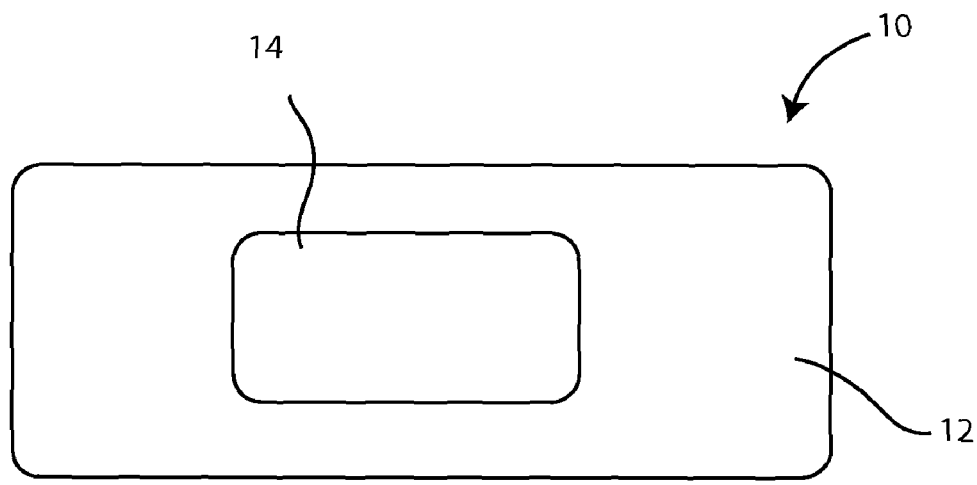
FIG. 1A is a top view of a filter for an electronic enclosure.
Figure 1B:
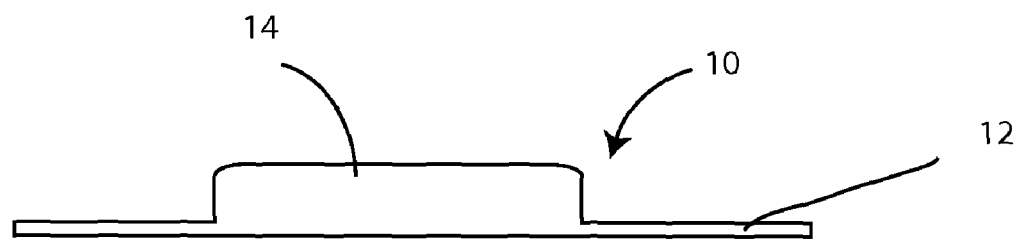
FIG. 1B is a side view of the filter of FIG. 1A.
Figure 1C:
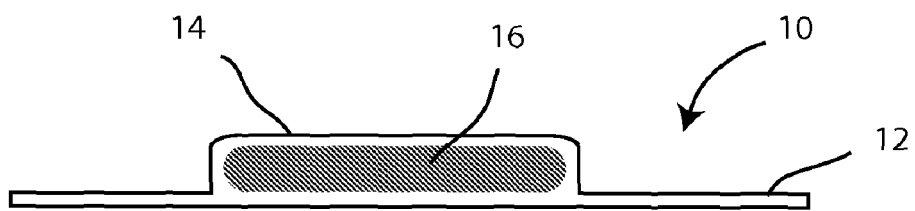
FIG. 1C is a cross sectional view of the filter of FIG. 1A.

An example filter for an electronic enclosure constructed according to the principles of the present invention is shown in FIGS. 1A, 1B, and 1C. FIG. 1A shows a top view of filter assembly 10, FIG. 1B shows a side view of filter assembly 10, and FIG. 1C shows a cross sectional view of filter assembly 10. Filter assembly 10 includes an attachment region 12 that is configured to provide a surface sufficient for the filter assembly 10 to be attached to an electronic enclosure. For example, attachment region 12 may be attached to an electronic enclosure by way of adhesive, fasteners, or mechanical means, among other alternatives. Filter region 14 is the region of filter assembly 10 where filtration effectively occurs. Filter region 14 is generally configured to be positioned within an electronic enclosure in a manner that enables filtration of the gas within the electronic enclosure. This may include the provision of baffles or other gas directing components to direct gases inside the electronic enclosure to the filter region 14. Filter region 14 is also optionally positioned over, or in fluid communication with, a breather vent in the electronic enclosure, such that gases entering the electronic enclosure will pass through the filter region 14.

As shown in cross section in FIG. 1C, the filter region 14 includes adsorbent material 16. The adsorbent material 16 is contained within a pocket formed in filter assembly 10. Adsorbent material 16 is a material that does not generally include hard particles such as silica. In one embodiment, adsorbent material 16 includes calcium chloride salt. The calcium chloride is included in the adsorbent material to adsorb water vapor and performs the function conventionally provided by silica gel. However, calcium chloride has the advantage that it is not a hard particle, so if some calcium chloride were to escape from the filter, it is less likely to cause damage to any electronic components present.

Figure 2:
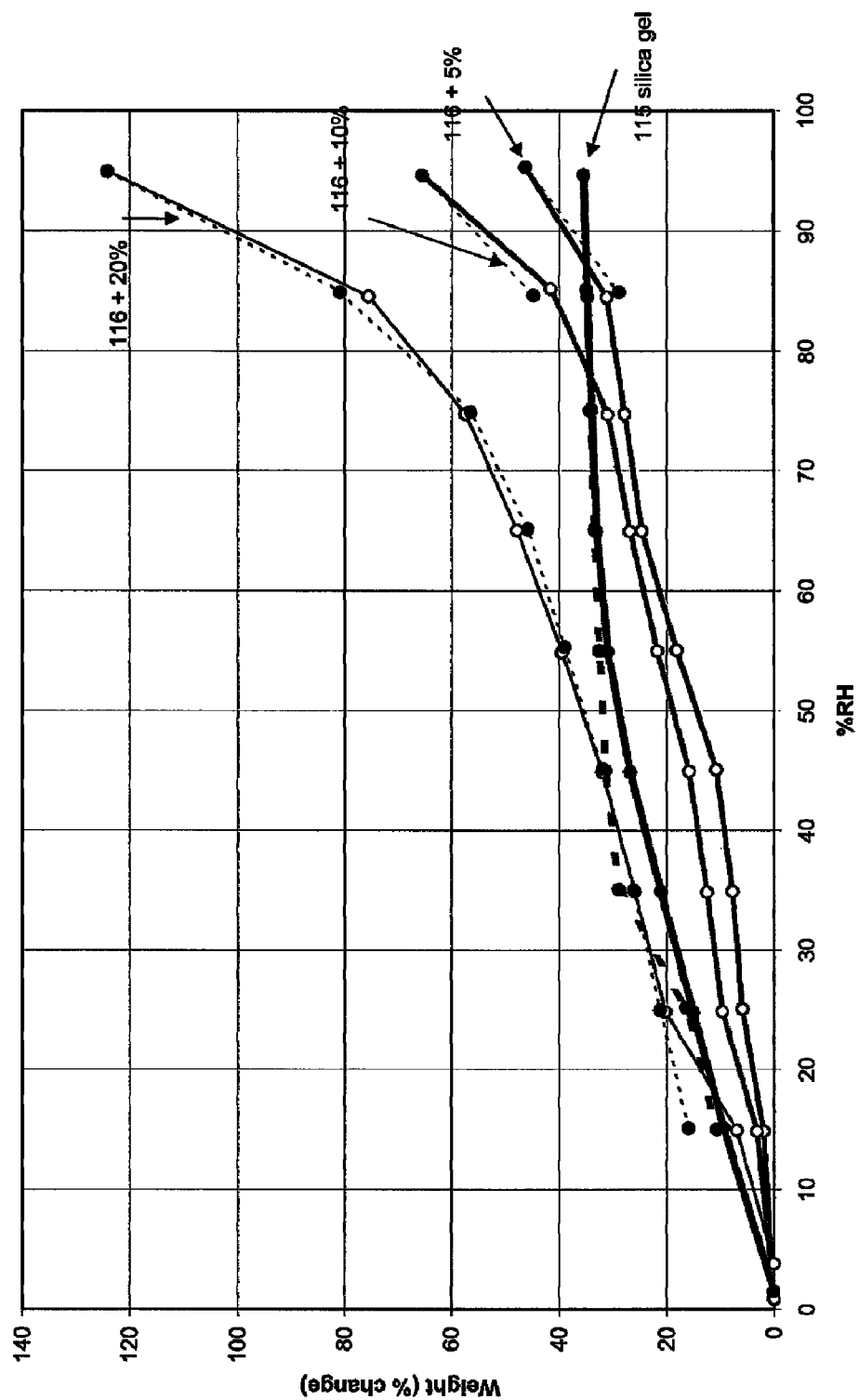
FIG. 2 is plot showing adsorption/desorption isotherms for various materials.

The performance of a combination of carbon and calcium chloride compared to a combination of carbon and silica gel for water vapor adsorption is demonstrated in FIG. 2. The plot of FIG. 2 shows the water adsorption potential of various materials as indicated by their percentage change in weight at different relative humidities. The line labeled "115 silica" gel represents the performance of a conventional mixture of carbon particles and silica gel. The remaining lines represent a mixture of carbon particles (represented by "116") and some percentage of calcium chloride, where the percentage of calcium chloride is the percentage given after the "+" sign and is a mass percentage.

As can be seen in FIG. 2, the various mixtures that contain calcium chloride tend to adsorb a much greater amount of water vapor at relatively high relative humidities, such as relative humidities over 90 percent. For the mixtures composed of carbon and 5 to 10 percent calcium chloride, the adsorption of water vapor is slightly less than for the mixture containing silica gel at relative humidities under 80 percent, but is generally greater at relative humidities greater than about 80 percent. For the mixture composed of carbon and 20 percent calcium chloride, the adsorption of water vapor is slightly greater than the mixture containing silica gel at relative humidities under about 70 percent, and is significantly greater at relative humidities greater than 70 percent.

FIG. 2 indicates that a mixture of carbon and calcium chloride has the potential to adsorb water vapor with a characteristic that at relatively low relative humidities is not greatly different from a mixture of carbon and silica gel. However, FIG. 2 also indicates that the mixture of carbon and calcium chloride may adsorb too much water vapor at higher relative humidities, increasing the risk that the calcium chloride would saturate and would allow water droplets to form. The formation of water droplets could impair or damage the electronic components present within the electronic enclosure. Although the carbon does also tend to adsorb water, and may also absorb water droplets generated by the calcium chloride, it is nevertheless typically undesirable to have water droplets form in the electronic enclosure. Therefore, it is important to select an appropriate concentration of calcium chloride that does not include too little calcium chloride to provide insufficient water adsorption and does not include too much calcium chloride to cause water droplets to possibly form at higher relative humidities.

In one embodiment of the invention, the filter material 16 is a mixture of carbon and 10 percent calcium chloride. In another embodiment, the filter material 16 is a mixture of carbon and 8 to 18 percent calcium chloride. In yet another embodiment, the filter material 16 is a mixture of carbon and 5 to 15 percent calcium chloride. An additional embodiment of filter material 16 includes a mixture of carbon and 2 to 20 percent calcium chloride.

In some embodiments, a polyolefin binder material is included in the filter material. Examples of polyolefin binders include, but are not limited to, polyethylene, polypropylene, polybutylene, copolymers of polyethylene, copolymers of polypropylene, or copolymers of polybutylene. Preferably, a polyolefin binder material is used that exhibits minimal, if any, off-gassing.

In some embodiments, the filter material 16 is granular in consistency. In other embodiments, the filter material 16 is powdery in consistency. In some other embodiments, the filter material 16 consists of pressed tablets.

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as "arranged", "arranged and configured", "constructed and arranged", "constructed", "manufactured and arranged", and the like.

This application is intended to cover adaptations or variations of the present subject matter. It is to be understood that the above description is intended to be illustrative, and not restrictive. The scope of the present subject matter should be determined with reference to the appended claims, along with the full scope of equivalents to which such claims are entitled.

What is claimed is:

1. An electronic enclosure containing a disk drive, the electronic enclosure comprising an adsorbent composite comprising:
    activated carbon; and
    calcium chloride,
    wherein the amount of calcium chloride ranges from about 5% to about 15% by mass of the composite.

2. The electronic enclosure containing a disk drive of claim 1, wherein the adsorbent material further comprises a binder.

3. The electronic enclosure containing a disk drive of claim 2, wherein the binder comprises a polyolefin.

4. The electronic enclosure containing a disk drive of claim 1, wherein the activated carbon comprises granules.

5. The electronic enclosure containing a disk drive of claim 1, wherein the activated carbon comprises a powder.

6. The electronic enclosure containing a disk drive of claim 1, wherein the amount of calcium chloride comprises approximately 10 percent by mass of the composite.

7. An electronic enclosure, the electronic enclosure comprising an adsorbent composite comprising:
    carbon;
    binder; and
    calcium chloride,
    wherein the amount of calcium chloride ranges from about 5% to about 15% by mass of the composite; and
    wherein the carbon comprises granules.

8. The electronic enclosure of claim 7, wherein the amount of calcium chloride is about 10% by mass of the adsorbent composite.

9. The electronic enclosure of claim 7, wherein the carbon comprises a powder.

10. The electronic enclosure of claim 7, wherein the binder comprises a polyolefin.

* * * * *